Figure 1:
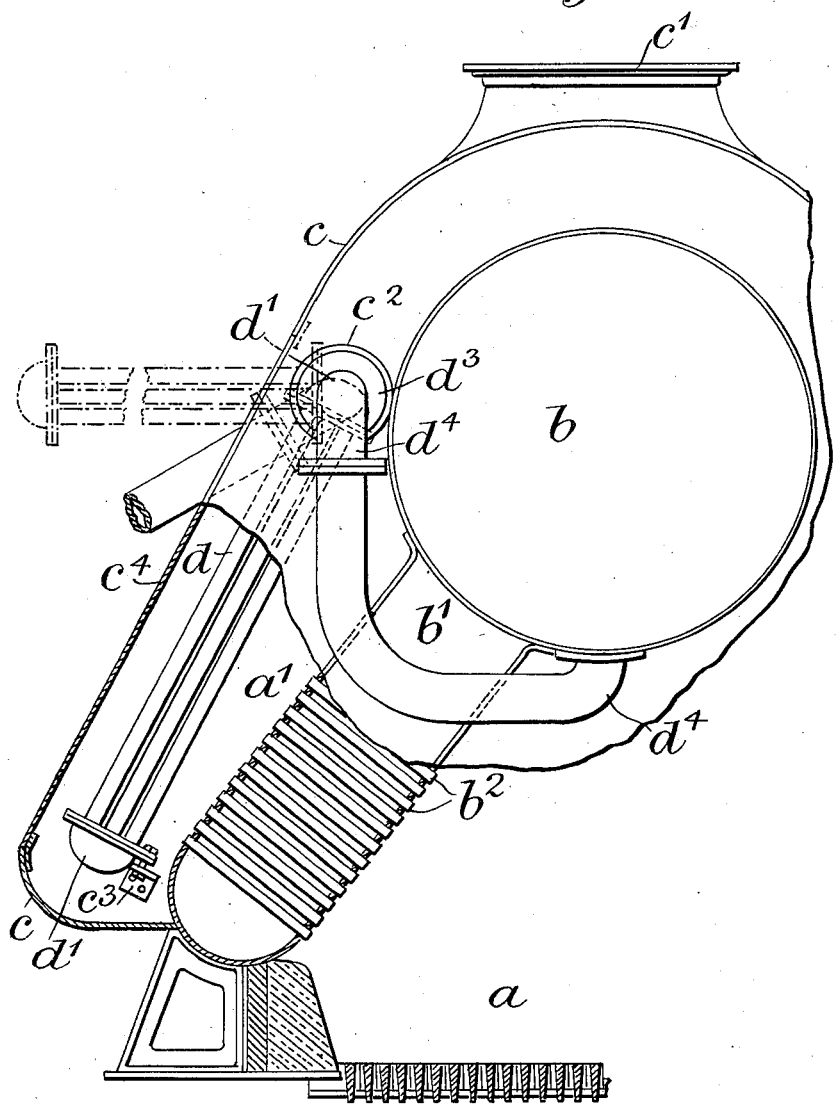

No. 658,246. Patented Sept. 18, 1900.
G. F. G. DES VIGNES & W. A. CLOUD.
STEAM GENERATOR.
(Application filed Apr. 30, 1900.)

(No Model.) 4 Sheets—Sheet 1.

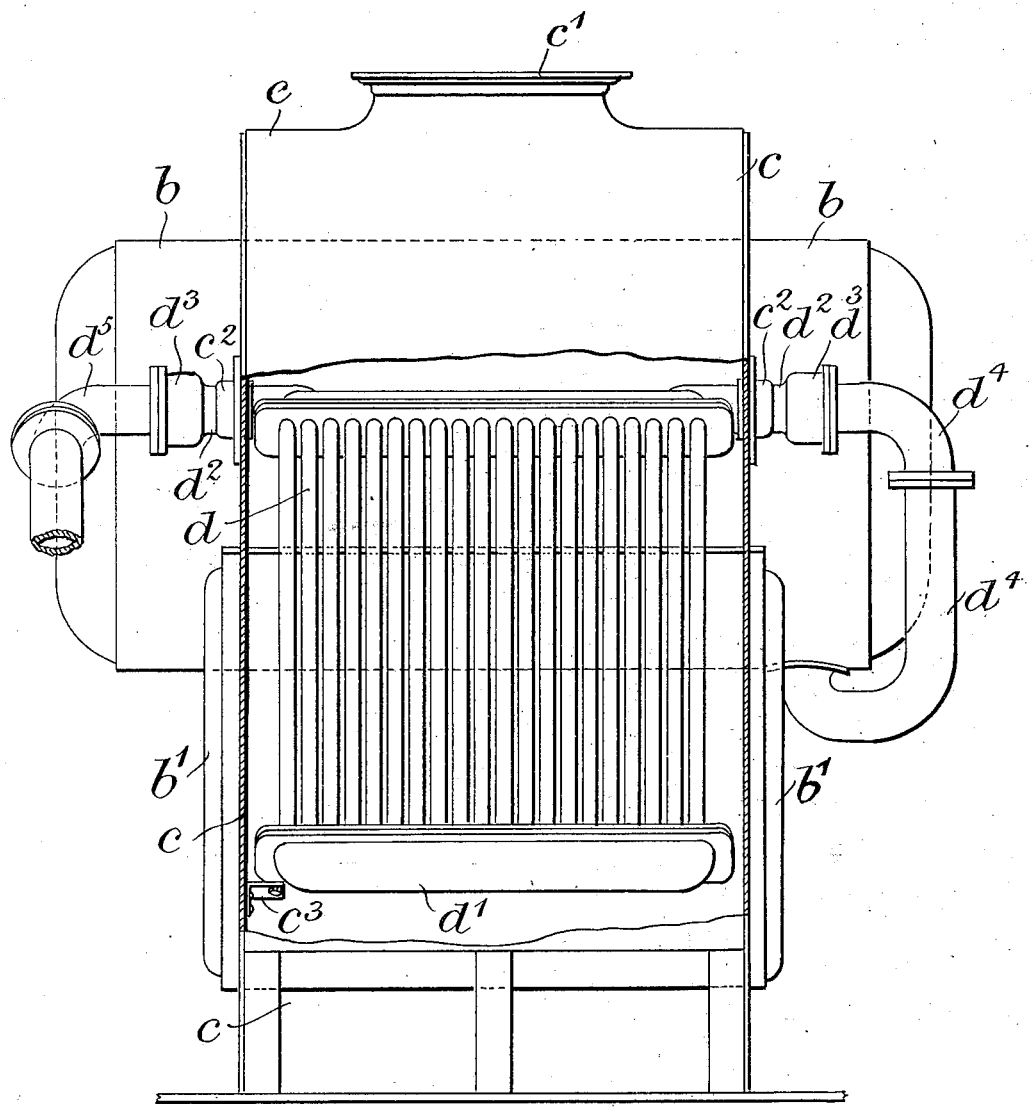

No. 658,246. Patented Sept. 18, 1900.
G. F. G. DES VIGNES & W. A. CLOUD.
STEAM GENERATOR.
(Application filed Apr. 30, 1900.)
(No Model.) 4 Sheets—Sheet 3.
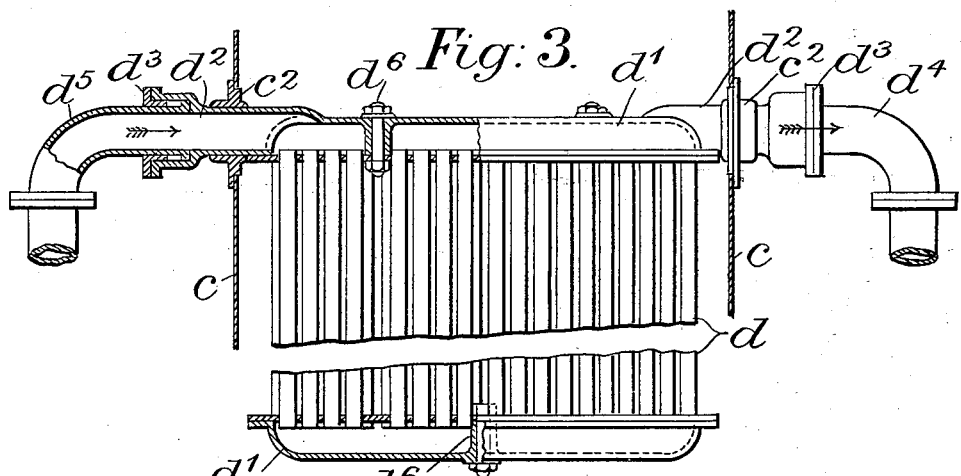
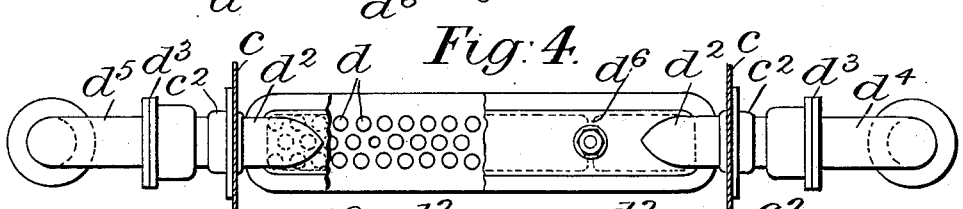
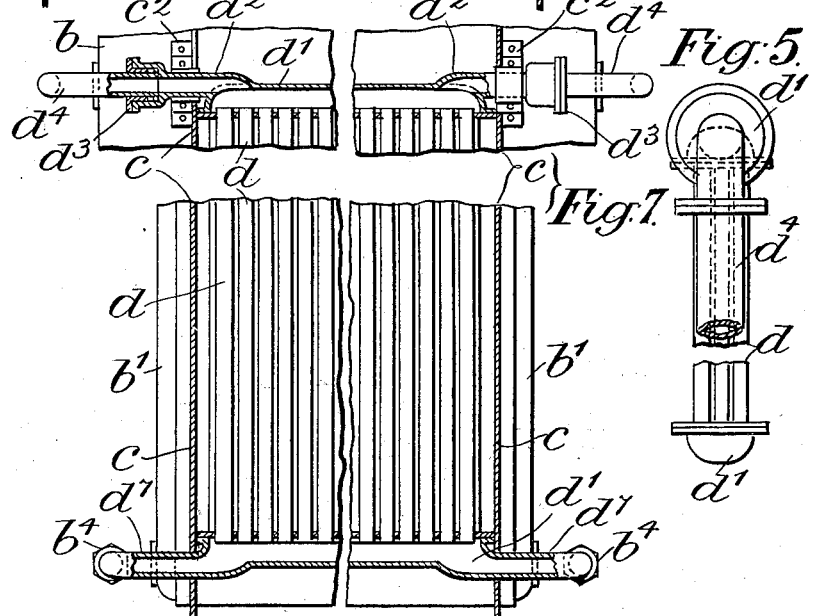

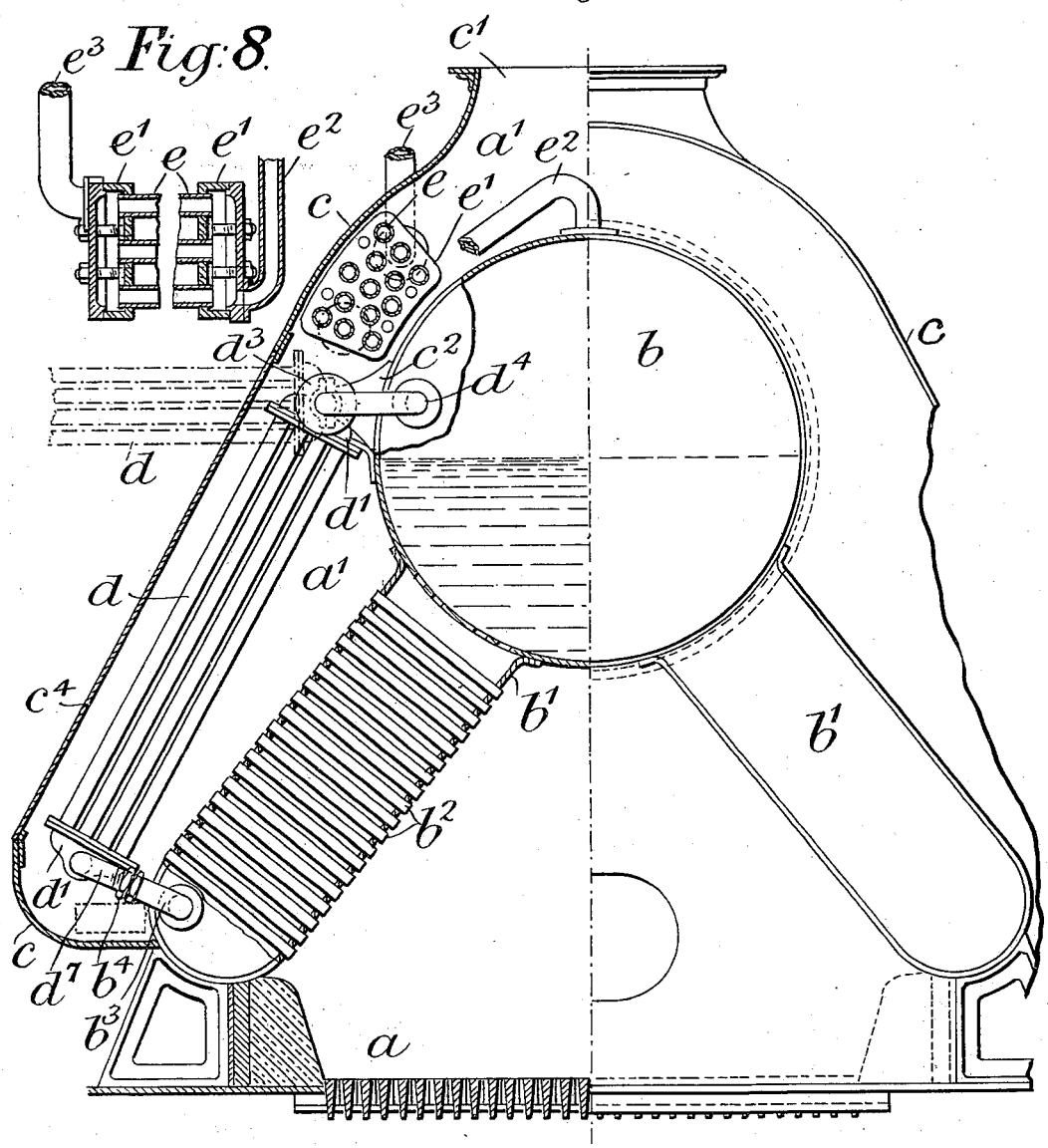

UNITED STATES PATENT OFFICE.

GEORGE FRANCIS GABRIEL DES VIGNES AND WALTER AMELIUS CLOUD, OF LONDON, ENGLAND.

STEAM-GENERATOR.

SPECIFICATION forming part of Letters Patent No. 658,246, dated September 18, 1900.

Application filed April 30, 1900. Serial No. 15,002. (No model.)

*To all whom it may concern:*

Be it known that we, GEORGE FRANCIS GABRIEL DES VIGNES, mechanical engineer, residing at Zoffany House, Strand-on-the-Green, Chiswick, London, and WALTER AMELIUS CLOUD, engineer, residing at Claremont Villa, Harvard road, Gunnersbury, London, in the county of Middlesex, England, subjects of the Queen of Great Britain, have invented certain new and useful Improvements in or Connected with Steam-Generators, of which the following is a specification.

This invention relates to improvements in or connected with smoke-tube steam-generators, and has for its object to more fully utilize the heat of the products of combustion from the furnace by the employment at each side of the generator of a group of water-tubes mounted with capability of being turned in bearings to admit of access being had to the smoke-tubes and which group of water-tubes may be arranged as a water heater or economizer or may be placed in the water circulation of the generator.

In carrying the invention into effect a steam and water chamber, preferably cylindrical in shape, is placed over the furnace and inclosed by a shell or casing, so as to leave a space all around the same, and this shell or casing is at its upper part provided with an outlet for the smoke and products of combustion. Projecting downwardly from the steam and water chamber and laterally diverging from each other are two rows of sectional tube-boxes or elements, or instead of being sectional each set of boxes might be in one continuous length, and the furnace occupies a position between these depending elements. The tube-boxes or elements, which may be rectangular in cross-section, are intersected by transverse smoke-tubes, and the smoke and products of combustion from the furnace pass through the tubes into a smoke box or space between the shell or casing and the tube-boxes. In this smoke-box is arranged a flattened group or groups of water-tubes, which at their ends are fixed with and open into longitudinal tube-boxes which connect the various tubes, and the smoke and products of combustion from the furnace after passing through the smoke-tubes of the elements pass around and among the water-tubes on their way to the uptake. The upper one of the tube-boxes is at the ends pivotally supported upon hollow trunnions mounted with capability of turning in bearings carried, for example, by brackets from the steam and water chamber. When the tubes are required as a water heater or economizer, one of these trunnions is by a gland or other suitable means coupled with the water-space of the steam and water chamber, and the other trunnion is similarly coupled with the pipe leading from the force-pump of the feed, and the two water-tube boxes are at suitable intervals furnished with partitions or baffle-plates, which compel the feed-water which is forced into one end of the upper tube-box to travel in a more or less circuitous or zigzag path through the group of tubes to the opposite end of the upper tube-box, whence it passes into the water-space of the steam and water chamber. In this case the lower tube-box is not connected with any portion of the generator; but if the group of tubes is arranged in the water circulation of the generator both the ends of the upper tube-box are connected with the steam and water chamber by pipes and glands or other suitable means and the ends of the lower tube-box are connected with the bottom of the smoke-tube boxes, thereby inducing a perfect circulation of the water in the boiler.

When access is desired to the smoke-tubes, a door or cover is removed from an opening in the shell or casing at least coextensive with the group of water-tubes, when the entire group of water-tubes may be turned on its trunnions out of the way.

When the group of tubes is arranged in the water circulation of the generator, it is necessary to disconnect the lower water-tube box from the bottom boxes or smoke-tube box before turning the group of tubes on its trunnions.

In order that the said invention may be more clearly understood and readily carried into effect, we will proceed, aided by the accompanying drawings, more fully to describe the same.

In the drawings, Figure 1 is an end elevation, partly in section, of a steam-generator fitted with a water heater or economizer according to the present invention. Fig. 2 is a side elevation thereof with part of the casing broken away. Fig. 3 is a sectional elevation of an economizer separately. Fig. 4 is a sectional plan or top view thereof. Fig. 5 is a sectional end view thereof. Fig. 6 is an end elevation, partly in section, of a steam-generator fitted with a group of water-tubes according to the present invention. Fig. 7 is a sectional elevation of a group of water-tubes separately, and Fig. 8 is a longitudinal section of parts.

In the several figures like parts are indicated by similar letters of reference.

Referring to Figs. 1 to 5, $a$ represents the furnace or combustion-chamber, and $b$ represents a steam or water chamber, preferably cylindrical in shape, which is placed over the furnace $a$, and $c$ represents a shell or casing which incloses the same, but so as to leave a space or flue $a'$ all around, and this shell or casing $c$ is at its upper part provided with an outlet $c'$ for the smoke and products of combustion.

Projecting downwardly from the steam and water chamber $b$ and laterally diverging from each other are two rows of sectional tube-boxes or elements $b'$, or instead of being sectional each set of tube-boxes $b'$ might be in one continuous length, and the furnace $a$ occupies a position between these depending elements.

The tube-boxes or elements, which may be rectangular in cross-section, are intersected by transverse smoke-tubes $b^2$, and the smoke and products of combustion from the furnace $a$ pass through the tubes $b^2$, into the smoke box or flue $a'$ between the shell or casing $c$ and the tube-boxes or elements $b'$.

In the smoke box or flue $a'$ at each side of the generator is arranged a flattened group of water-tubes $d$, which at their ends are fixed with and open into longitudinal tube-boxes $d'$, which connect the various tubes $d$, and the smoke and products of combustion from the furnace $a$ after passing through the smoke-tubes $b^2$ of the elements $b'$ pass around and among the water-tubes $d$ on their way to the uptake $c'$.

The upper one of the tube-boxes $d'$ is at its ends pivotally supported upon hollow trunnions $d^2$, mounted with capability of turning in bearings $c^2$, carried by the casing $c$, or it might be by brackets, from the steam and water chamber $b$, and the hollow trunnions $d^2$ pass through the bearings $c^2$ to the outside of the casing $c$. One of the trunnions $d^2$ is by a stuffing-box $d^3$ and pipe $d^4$ coupled with the water-space of the steam and water chamber $b$, and the other trunnion $d^2$ is similarly coupled with a pipe $d^5$, leading from the force-pump of the feed.

The two water-tube boxes $d'$ are at suitable intervals furnished with partitions or baffle-plates $d^6$, which compel the feed-water which is forced into one end of the upper tube-box $d'$ to travel in a more or less circuitous or zigzag path through the group of tubes $d$ to the opposite end of the upper tube-box $d'$, whence it passes into the water-space of the steam and water chamber $b$, and in this case the lower tube-box $d'$ is not connected with any portion of the generator, but rests against and is removably bolted to a bracket $c^3$ from the casing $c$.

When access is desired to the smoke-tubes $b^2$, a door or cover $c^4$, covering an opening provided in the shell or casing $c$, at least coextensive with the group of water-tubes $d$, is removed, when the entire group of water-tubes $d$ may, after disconnecting it from the bracket $c^3$, be turned on its trunnions $d^2$ out of the way, as indicated by the dotted lines in Fig. 1.

It will be understood that an economizer may be arranged on each side of the generator, in which case a separate feed may be arranged in connection with each group of tubes, or the feed-water would be introduced into one group and conveyed by a pipe to and passed through the other on its way to the steam and water chamber $b$.

In the example given at Figs. 6 to 8 a flattened group of water-tubes $d$ is mounted upon hollow trunnions $d^2$ in a similar manner to that hereinbefore shown and described with respect to the previous figures; but in this case the device is placed in the water circulation of the generator. For this purpose the hollow trunnions $d^2$ at both ends of the upper tube-box $d'$ are connected with the steam (or it might be the water) space of the steam and water chamber $b$ by means of stuffing-boxes $d^3$ and pipes $d^4$, and the ends of the lower tube-box $d'$ are connected with the lower part of the water-space of the smoke-tube boxes $b'$ by pipes $d^7$, carried by the tube-box $d'$, and unions $b^4$, coupling them with similar pipes $b^3$, carried by the tube-box $b'$, thereby inducing a perfect circulation of the water in the generator. According to this arrangement when access is desired to the smoke-tubes $b^2$ the pipes $d^7$ and $b^3$ are disconnected at the unions $b^4$, the door $c^4$ in the casing $c$ is opened, and the group of water-tubes $d$ is swung outward on the trunnions $d^2$, as described with respect to the previous arrangement. In the smoke box or flue $a'$ is or may be placed a steam-superheater consisting of a group of tubes $e$, opening into tube-boxes $e'$, one of which is by a pipe $e^2$ connected with the upper part of the steam and water chamber $b$ and the other of which is fitted with a steam-supply pipe $e^3$. The feed-water may be introduced into the water-space at the lower part of the smoke-tube boxes $b'$ or into the lower part of the steam and water chamber $b$, as may be found convenient.

By the means hereinbefore described the products of combustion from the furnace $a$ after passing through the smoke-tubes $b^2$ on their way to the uptake in addition to acting upon the steam and water chamber $b$ also give up part of their heat to the group of tubes $d$, while by reason of the peculiar construction of the latter access may readily be obtained to the smoke-tubes for cleaning or other purposes.

What we claim is—

1. A steam-generator comprising a steam and water chamber, depending divergent members or elements, transversely-intersecting smoke-tubes, a furnace located beneath and between said depending members, a casing surrounding the generator and furnace and leaving a smoke box or flue around the same, a flattened group of water-tubes located in said flue at each side of the generator, said group being mounted upon hollow trunnions so that it may be turned on said trunnions in order to give access to the smoke-tubes and communicating with the steam and water chamber, whereby the said group may constitute a part of the circulating system of the generator or a feed-water heater in said system, substantially as described.

2. A steam-generator comprising a steam and water chamber, and depending divergent members or elements, transversely-intersecting smoke-tubes, a furnace located beneath and between said members, a casing surrounding the generator and furnace and leaving a smoke box or flue around the same, a flattened group of water-tubes located in said flue, tube-boxes connecting the ends of said tubes the upper one of which is provided with hollow trunnions mounted in suitable bearings, and a pipe leading from the feed-water supply to one of the tube-boxes, and another pipe leading from the other tube-box to the steam and water chamber, substantially as described.

3. A steam-generator comprising a steam and water chamber, and depending divergent members or elements, transversely-intersecting smoke-tubes, a furnace located beneath and between said members, a casing surrounding the generator and furnace and leaving a smoke box or flue around the same, a flattened group of water-tubes located in said flue, tube-boxes connecting the ends of said tubes, the upper one of which is provided with hollow trunnions mounted in suitable bearings, and a pipe leading from the feed-water supply to one of the tube-boxes, and another pipe leading from the other tube-box to the steam and water chamber, and partitions in said tube-boxes arranged to cause the feed-water to travel a circuitous path therethrough, substantially as described.

4. A steam-generator comprising a steam and water chamber, depending divergent members or elements, transversely-intersecting smoke-tubes, a furnace located beneath and between said depending members, a casing surrounding the generator and furnace and leaving a smoke box or flue around the same, a group of water-tubes located in said flue at each side of the generator, said group being mounted upon hollow trunnions so that it may be turned on said trunnions in order to give access to the smoke-tubes and communicating with the steam and water chamber, whereby the said group may constitute a part of the circulating system of the generator or a feed-water heater in said system, substantially as described.

5. A steam-generator comprising a steam and water chamber, and depending divergent members or elements, transversely-intersecting smoke-tubes, a furnace located beneath and between said members, a casing surrounding the generator and furnace and leaving a smoke box or flue around the same, a group of water-tubes located in said flue, and tube-boxes connecting the tubes at their ends, hollow trunnions on the upper tube-box mounted in bearings, and pipes connecting the upper tube-box with the steam and water chamber, and detachable connections between the lower tube-box and the lower part of the water-space of said depending members, substantially as described.

6. In a steam-generator, the combination with a steam and water chamber, of a group of water-tubes located in the tubes or flues for the products of combustion, and hollow trunnions on said group mounted in suitable bearings, whereby said group of tubes may be swung out of the way, in order to give access to said smoke flues or tubes, substantially as described.

GEORGE FRANCIS GABRIEL DES VIGNES.
WALTER AMELIUS CLOUD.

Witnesses:
GEO. S. VAUGHAN,
W. M. HARRIS.